(12) United States Patent
Thrash et al.

(10) Patent No.: US 10,348,740 B2
(45) Date of Patent: Jul. 9, 2019

(54) SYSTEMS AND METHODS FOR THREAT ANALYSIS OF COMPUTER DATA

(71) Applicant: Computer Sciences Corporation, Falls Church, VA (US)

(72) Inventors: Ralph W. Thrash, Falls Church, VA (US); Donald Gauger, Falls Church, VA (US); William Glossner, Falls Church, VA (US); Scott P. Peters, Falls Church, VA (US); Dan Hushon, Falls Church, VA (US)

(73) Assignee: COMPUTER SCIENCES CORPORATION, Tysons, VA (US)

( * ) Notice: Subject to any disclaimer, the term of this patent is extended or adjusted under 35 U.S.C. 154(b) by 0 days.

(21) Appl. No.: 16/001,253

(22) Filed: Jun. 6, 2018

(65) Prior Publication Data

US 2019/0081957 A1    Mar. 14, 2019

Related U.S. Application Data

(63) Continuation of application No. 15/627,133, filed on Jun. 19, 2017, now abandoned, which is a
(Continued)

(51) Int. Cl.
*H04L 29/06* (2006.01)
*G06F 21/56* (2013.01)

(52) U.S. Cl.
CPC .............. *H04L 63/14* (2013.01); *G06F 21/56* (2013.01); *H04L 63/0227* (2013.01);
(Continued)

(58) Field of Classification Search
CPC ..... H04L 29/06; H04L 63/1441; H04L 63/14; G06F 21/56; G06F 9/00; G06F 21/00
See application file for complete search history.

(56) References Cited

U.S. PATENT DOCUMENTS 8,042,184 B1   10/2011   Batenin
8,701,192 B1   4/2014    Glick
(Continued)

FOREIGN PATENT DOCUMENTS

WO    2012162102    11/2012

OTHER PUBLICATIONS

European Patent Application No. 15851075.0, Search Report dated Apr. 4, 2018.
(Continued)

*Primary Examiner* — Amir Mehrmanesh
(74) *Attorney, Agent, or Firm* — Sheppard Mullin Richter & Hampton LLP (57) ABSTRACT

Various embodiments of the present disclosure can include systems, methods, and non-transitory computer readable media configured to aggregate a plurality of threat signatures from a plurality of threat signature data sources. The bit stream data is analyzed, based on the plurality of threat signatures, to detect a first threat in the bit stream data. A result of analyzing the bit stream data is logged as threat analysis log data. The threat analysis log data is analyzed to detect a second threat in the bit stream data. The threat analysis log data may be analyzed based on a heuristic. An action is triggered based on analysis of the bit stream data, or based on heuristic analysis of the threat analysis log data.

19 Claims, 9 Drawing Sheets

Related U.S. Application Data continuation of application No. 14/517,726, filed on Oct. 17, 2014, now abandoned.

(52) U.S. Cl.
CPC ...... *H04L 63/0281* (2013.01); *H04L 63/1416* (2013.01); *H04L 63/1441* (2013.01)

(56) References Cited

U.S. PATENT DOCUMENTS

| | | |
|---|---|---|
| 9,088,606 B2 | 7/2015 | Ranum |
| 2003/0204632 A1 | 10/2003 | Willebeek-LeMair |
| 2009/0070870 A1 | 3/2009 | Riordan |
| 2010/0088756 A1 | 4/2010 | Balakrishnan |
| 2011/0247072 A1 | 10/2011 | Staniford |
| 2014/0013434 A1 | 1/2014 | Ranum |
| 2014/0223566 A1 | 8/2014 | Zaitsev |
| 2017/0237760 A1* | 8/2017 | Holeman ............ G06F 9/45558 726/22 |
| 2018/0025157 A1* | 1/2018 | Titonis .................... G06F 21/56 726/24 |
| 2018/0191766 A1* | 7/2018 | Holeman ............ H04L 63/1433 |

OTHER PUBLICATIONS

International Application No. PCT/US2015/056079, International Search Report and Written Opinion dated Feb. 17, 2016.

* cited by examiner

SYSTEMS AND METHODS FOR THREAT ANALYSIS OF COMPUTER DATA

CROSS-REFERENCE TO RELATED APPLICATIONS

This application is a continuation of U.S. patent application Ser. No. 15/627,133, filed on Jun. 19, 2017 and entitled "SYSTEMS AND METHODS FOR THREAT ANALYSIS OF COMPUTER DATA", which is a continuation of U.S. patent application Ser. No. 14/517,726, filed on Oct. 17, 2014 and entitled "SYSTEMS AND METHODS FOR THREAT ANALYSIS OF COMPUTER DATA", which are all incorporated herein by reference.

FIELD OF THE INVENTION

Inventions disclosed herein relate to data analysis and, more particularly, analyzing computer data flowing over a network.

BACKGROUND

Detection of computer security threats is vital to maintaining modern infrastructure for personal, business, and national security purposes. Generally, computer security threat detection may be implemented on a network (e.g., at the perimeter of a private network), at individual client devices, or both. With respect to a network, threat detection is often implemented using one or more network firewalls, deep packet inspection (DPI) appliances, and intrusion detection systems (IDSs), and the like. Unfortunately, traditional implementations of network threat detection usually lack network throughput speed, require manual configuration maintenance (e.g., blacklist IP lists), utilize threat signatures from a single source, or provide a very discrete threat detection solution (e.g., solution unique to a particular vendor) that is fragmented with respect to other threat detection solutions. In view of this, various government entities (e.g., U.S. Federal Government), infrastructure entities (e.g., utility companies), and commercial entities can benefit from a threat detection that is in-line, and more robust and real time than those traditionally utilized.

SUMMARY

Various embodiments of the present disclosure can include systems, methods, and non-transitory computer readable media configured to aggregate a plurality of threat signatures from a plurality of threat signature data sources. The bit stream data is analyzed, based on the plurality of threat signatures, to detect a first threat in the bit stream data. A result of analyzing the bit stream data is logged as threat analysis log data. The threat analysis log (or stream) data is analyzed to detect a second threat in the bit stream data. The threat analysis log (or stream) data may be analyzed based on a heuristic. An action is triggered based on analysis of the bit stream data, or based on heuristic analysis of the threat analysis log data.

In an embodiment, the bit stream data is received over a network connection from a network device.

In an embodiment, the analyzing the threat analysis stream or log data is based on at least one heuristic and typically a multitude of heuristics.

In an embodiment, the analyses of bit stream data based on the plurality of threat signatures and of threat analysis log (or stream) data based on heuristics can be performed in parallel or in sequence. The analyses can be included in a chain of independent or cooperative analyses, where the output of one analysis can be shared with the other analyses to improve specificity and security.

In an embodiment, a user is notified regarding the first threat or the second threat when identified.

In an embodiment, the first threat and the second threat are similar.

In an embodiment, the bit stream data is outputted in response to the first threat and the second threat not being detected in the bit stream data.

In an embodiment, the action comprises configuring a network device to address the first threat in response to the first threat being detected in the bit stream data, or configuring the network device to address the second threat in response to the second threat being detected in the bit stream data. The network device may be configured by configuring a network traffic aggregation system, where the network traffic aggregation system configures the network device. Depending on the embodiment, the network device may be an edge network device or an internal network device.

In an embodiment, the analyzing the bit stream data based on the plurality of threat signatures comprises performing deep packet inspection based on the plurality of threat signatures In an embodiment, the analyzing the bit stream data is performed by bit stream vector processing, or the analyzing the threat analysis log data is performed by bit stream vector processing.

In an embodiment, the (triggered) action comprises at least one of dropping a packet in the bit stream data, routing the packet to a filter for deeper packet inspection, tagging the packet with a meta risk indicator or a meta risk score, rerouting the packet to its destination, or rerouting the packet to a sandbox for quarantine.

In an embodiment, the triggering the action is performed by bit stream vector processing by a combination of parallel and/or sequential set of workers that are dynamically assigned.

In an embodiment, at least one threat signature data source in the plurality of threat signature data sources is commercial, proprietary, or open source.

In an embodiment, the plurality of threat signature data sources includes independent organizations.

In an embodiment, the threat analysis log data includes log data produced by an external deep packet inspection system. The external deep packet inspection system may perform deep packet inspection on the bit stream data before the analyzing the bit stream data based on the plurality of threat signatures, or before the analyzing the threat analysis log data.

Many other features and embodiments of the invention will be apparent from the accompanying drawings and from the following detailed description.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Various systems and methods described herein analyze for computer security threats (herein, also referred to as "threats") in computer data and more particularly provide a signature-oriented and heuristic-oriented protection against threats in computer data. For some embodiments, the systems and methods described herein may comprise signature-based and heuristic-based analyses to attempt to detect threats in a stream of data, such as a bit stream of data (bit stream data). For example, systems and methods described herein may implement real-time, in-line cyber protection to network users. The protection may comprise a signature-based analysis based on threat signatures aggregated (e.g., in real-time) from multiple threat feeds, and may further comprise a (set of) heuristic-based analysis of threat analysis log or stream data produced from signature-based analyses (e.g., those based on the aggregated threat signatures and others). In this way, systems and methods described herein may perform in-line threat analysis (e.g., in-line with a network pipeline) and may perform such analysis at wire speed. For instance, systems and methods described herein may handle analysis of data communicated over a network (e.g., deep packet inspection), at carrier grade network speeds (e.g., 10 Gbps and higher), with low latency, and at or near real-time. Depending on the embodiment, the systems and methods described herein may be implemented as a System as a Service. The systems and methods described herein may be implemented on a private network, such as a corporate network, and may be implemented at a network perimeter (e.g., edge of private network). Accordingly, threat detection in accordance with the systems and methods described herein may provide a multitude of in-line evaluators to introduce a variety of threat signatures/patterns from various sources, perform heuristic analytics against a variety of threat indicators, determine a protective action, and trigger a response in a more effective manner than conventional systems that tend to act singularly and non-cooperatively.

According to some embodiments, signatures that facilitate identification of computer security threats in computer data are aggregated (e.g., ingested) from two or more threat signature sources (e.g., computer security vendors), which may be organizations that are separate and independent from one another. Threat signature sources may be proprietary (e.g., signatures derived from CSC Data Center operations or Cyber-Security activities), open source (e.g., Team Cymru or SANS Institute), or commercial (e.g., McAfee® or Symantec®) in nature, and may provide or make their set of threat signatures available through different means. For example, a particular threat signature source may provide their set of threat signatures through a threat data feed or as a downloadable data file. Threat data feeds also can include, for example, commercial whitelist or blacklist global threat data feeds. Threat data feeds from these sources can be deployed to examine the in-line data stream using open source tools, like Snort or Suricata, to parse log data, and act upon threat data. Additionally other open source tools can be used to support the action of the packet inspection and the actions of the systems and methods described herein, such as Red Hat Linux, Barnyard, Bro, and SiLK, among others.

Some threat signature sources exclusively provide their proprietary set of threat signatures to only one or more threat analysis software applications or systems, such as their own computer security products. For such threat signature sources, the proprietary set of threat signatures may be aggregated by way of one or more of the threat analysis software applications or systems exclusively using the proprietary set of threat signatures. For example, a system or method may aggregate the propriety set of threat signatures by analyzing (e.g., scraping) the log data generated by the threat analysis software applications or systems that are exclusively using the proprietary set of threat signatures.

Computer data, such as bit stream data, can be analyzed using signature matching based on the aggregated threat signatures obtained from the plurality of threat signature sources. Sets of threat signatures from different threat signature sources can differ in the number threat signatures, the threats covered, and the threat signatures available for a given threat. In view of this, using the set of aggregated threat signatures to detect threats in computer data can increase the likelihood of detecting a threat over only using a single set of threat signatures from one threat signature source to detect threats. Additionally, using a set of aggregated threat signatures to detect threats at the edge of a network can reduce the number of threat analysis software applications and systems that need to be utilized for a computer security implementation within that network. This signature aggregation can maintain a high throughput speed when analyzing computer data in-line (e.g., in-line threat detection between an internal and external network) using advanced high data throughput programmable appliances.

According to some embodiments, the signature-based analysis for threats can be augmented by a heuristic-based analysis of log data to detect threats, some of which may have not been detected during the signature-based analysis. In this way, the heuristic-based analysis can reduce the number of threat false positives that may otherwise result from using one or more signature-based threat analyses alone. The log data analyzed may include log data produced by the signature-based threat analysis based on the aggregated threat signatures, and log data produced by a third-party signature oriented threat analysis (e.g., one performed by a commercial deep packet inspection appliance, such as McAfee M-8000 or HP TippingPoint). The heuristic-based analysis may detect threats using heuristics similar to those utilized by some intrusion detection systems, and may involve interpolating threat analysis log data to detect threats. For some embodiments, the heuristic-based analysis may comprise using positive or negative correlation and learning correlation cluster behaviors over time. In some embodiments, threats detected by signature-based threat analysis may be similar to, identical with, or different from threated detected by heuristic-based threat analysis.

Based on a threat being detected by the signature-based analysis, the heuristic-based analysis, or both, an action may be triggered to address the detected threat. Additionally, based on a threat being detected by the signature-based analysis, the heuristic-based analysis, or both, in-line active defenses can be performed or a notification may be sent to one or more users or automated systems concerned about such threats (e.g., a network security operations engineer or a tuned router or network appliances spread across a local or wide area network). Depending on the embodiment, the action triggered may include dropping one or more network packets relating to the threat, routing the network packets to a filter for deeper packet inspection, tagging the network packets with a meta risk indicator or a meta risk score, rerouting the network packets to their destination, or rerouting the network packets to a sandbox for quarantine (e.g., for later analysis). The action triggered may also include dynamic routing of network packets, which may involve configuring or reconfiguring a router (e.g., a downstream router), or configuring or reconfiguring a software defined network (SDN) or a network router included in the SDN.

For some embodiments, notifications regarding threats may be automatically sent to a user through electronic message (e.g., e-mail or text message) or by way of an action system, such as a security information and event management system (SIEM) (e.g., HP ArcSight®). In various embodiments, a security issue detected by an action system (e.g., based on threat analysis log data) can trigger an action to address the security issue detected.

In some embodiments, systems and methods are implemented using vectorized comparators, which may be organized in either a multiple instruction multiple data (MIMD), or a Multiple Instruction Single Data (MISD) orientation that enables in-line analysis of network packets. For heuristic-based analysis, network packets may be tagged with a unique identifier and processed according to a heuristically arranged set of operations (e.g., sequential or parallel), which may enable risk-based decisions on threat detection.

The figures described herein depict various embodiments of the present invention for purposes of illustration only. Alternative embodiments of the structures and methods illustrated in the figures may be employed without departing from the principles of the invention described herein.

Figure 1:
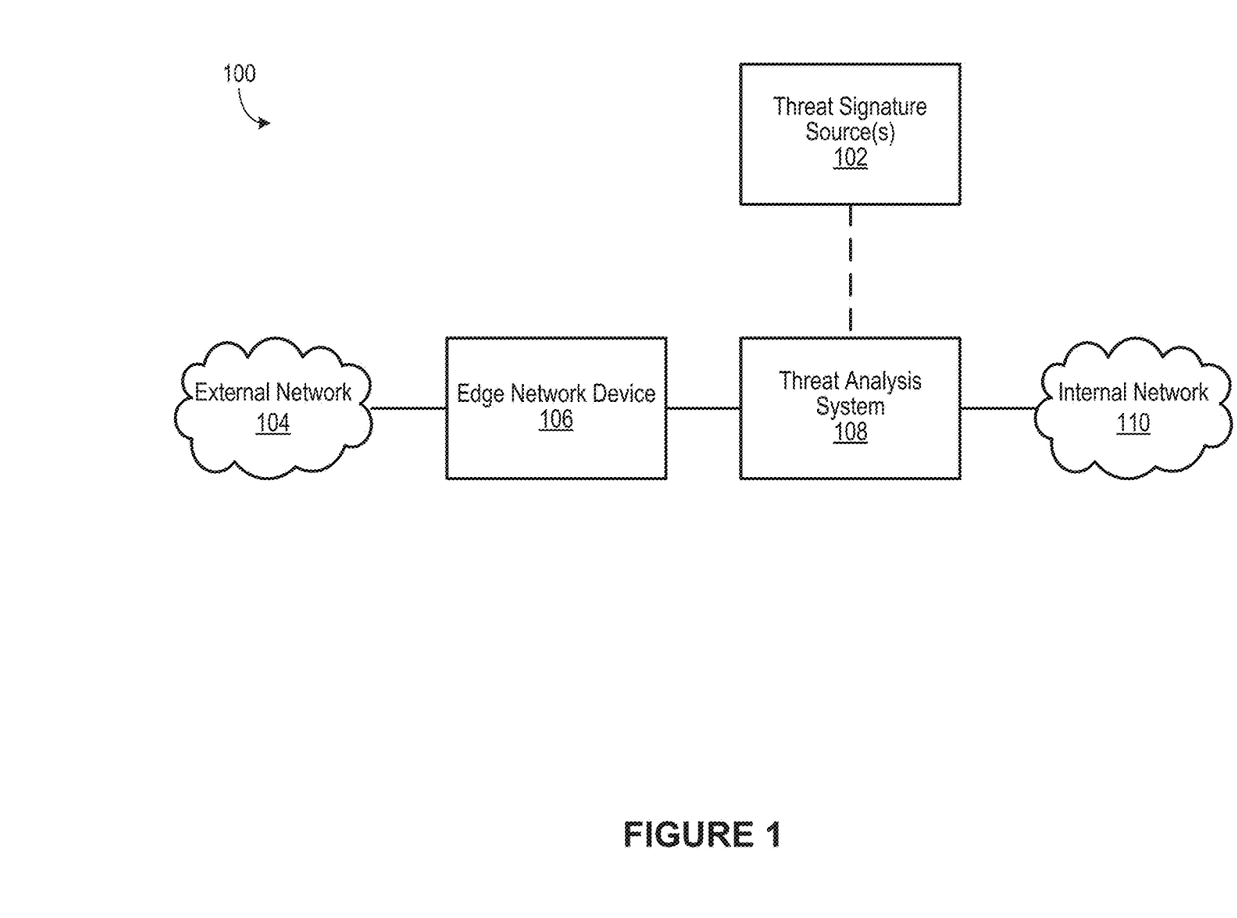
FIG. 1 illustrates an example environment for a threat analysis system, according to an embodiment of the present disclosure.

FIG. 1 illustrates an example environment 100 for a threat analysis system, according to an embodiment of the present disclosure. As shown, the example environment 100 includes one or more threat signature sources 102, an external network 104, an edge network device 106, a threat analysis system 108, and an internal network 110. It will be understood that for some embodiments the components or the arrangement of components in the example environment 100 may differ from what is depicted in FIG. 1.

In accordance with some embodiments, the external network 104 or the internal network 110 may be implemented using one or more local or wide-area communications networks, such as the Internet, WiFi networks, WiMax networks, private networks, public networks, and the like. Depending on the embodiment, some or all of the communication connections with the external network 104 or the internal network 110 may utilize encryption (e.g., Secure Sockets Layer [SSL]) to secure information being transferred between the various entities shown in the example environment 100.

For some embodiments, the threat analysis system 108 may communicate data with one or more of the threat signature sources 102 over a network, which may include the external network 104 or the internal network 110 of the example environment 100. The threat analysis system 108 may communicate with the external network 104 through the edge network device 106, which may represent network perimeter for the internal network 110. The internal network 110 may be a private network and may be associated with an organization, such as a corporation (e.g., private corporate network). The external network 104 may be a public network, such as the Internet. Data communicated between a network device on the external network 104 and a network device on the internal network 110 may be transmitted through the edge network device 106 and the threat analysis system 108 before reaching its destination. It will be understood that in some embodiments additional or different networked systems and devices may exist on the network communication path between the threat analysis system 108 and the external network 104, and on the network communication path between the threat analysis system 108 and the internal network 110, including additional threat analysis systems (e.g., deep packet inspection application by a third party).

One or more of the threat signature sources 102, the edge network device 106, and the threat analysis system 108 may be implemented by, or utilize, one or more modules as described herein. For instance, one or more of the threat signature sources 102, the edge network device 106, and the threat analysis system 108 may be implemented using a computer system similar to the one discussed later with respect to FIG. 6.

As used herein, computing devices may include a mobile phone, a tablet computing device, a laptop, a desktop computer, personal digital assistant, a portable gaming unit, a wired gaming unit, a thin client, a set-top box, a portable multi-media player, or any other type of touch-enabled computing device known to those of skill in the art. Further, the threat analysis system 108 may comprise one or more servers, which may be operating on or implemented using one or more cloud-based resources (e.g., System-as-a-Service [SaaS], Platform-as-a-Service [PaaS], or Infrastructure-as-a-Service [IaaS]).

The threat analysis system 108 may be configured to aggregate threat signatures from two or more of the threat signature sources 102. As described herein, the threat signature sources 102 may represent multiple threat feeds, provided by separate and independent threat signature sources. One or more of the threat signature sources 102 may be proprietary (e.g., HP TippingPoint DVLab data or McAfee® Global Threat data), open source (e.g., Team Cymru or SANS Institute), or commercial (e.g., Computer Sciences Corp, McAfee® or Symantec®) in nature. During the aggregation, the threat analysis system 108 may parse the threat signatures being aggregated and may locally store the aggregated threat signatures. By parsing and locally storing the aggregated threat signatures, the threat analysis system 108 may provide a merged set of threat signatures for subsequent use by signature-based threat analysis processes.

The threat analysis system 108 may be configured to receive network data being communicated from the external network 104 to the internal network 110 through the edge network device 106, or vice versa. The network data received may comprise one or more network packets that may analyzed for threats as the network data passes through the threat analysis system 108. By doing so, the threat analysis system 108 can permit legitimate network traffic to be communicated between the external network 104 and the internal network 110, can detect threats contained in the network traffic based on signature-based or heuristic-based analysis, and can protect against (e.g., block) threats detected in the network traffic by triggering one or more actions. Depending on the embodiment, the threat analysis system 108 may analyze network data as a bit stream of data.

The threat analysis system 108 may be configured to detect threats in the network traffic by first performing a signature-based threat analysis of the network traffic using the threat signatures aggregated from two or more of the threat signature sources 102. During the signature-based threat analysis, the threat analysis system 108 may match the data in the network traffic against the aggregated threat signatures to detect known threats. Depending on the embodiment, the threat analysis system 108 may utilize suitable deep packet inspection processes, such as those provided by Snort and similar software applications, to perform the signature-based threat analysis.

Any results produced by the signature-based analysis may be logged as threat analysis log data, which may be subsequently used during the heuristic-based threat analysis. The threat analysis log data may also contain results produced by one or more third-party threat analysis systems (e.g., deep packet inspection appliance). Depending on the embodiment, third-party threat analysis systems may be analyzing the network traffic prior to, in parallel with, or subsequent to the signature-based threat analysis being performed by the threat analysis system 108. For some embodiments, third-party threat analysis systems analyze the network traffic prior to the threat analysis system 108 performing the heuristic-based threat analysis.

The threat analysis system 108 may be configured to perform heuristic-based threat analysis of the network traffic by analyzing the threat analysis log data, which may be generated during the signature-based threat analysis, and which may further be generated by one or more third-party threat analysis systems (e.g., such as one provided by McAfee®). The heuristic-based threat analysis may interpolate the threat analysis log data to detect threats. Additionally, heuristic-based threat analysis may detect threats by using positive or negative correlation and learning correlation cluster behavior over time. For example, the heuristic-based threat analysis may observe suspicious data patterns in the threat analysis log data, historical threat analysis log data, or by comparing threat analysis log data. In some embodiments, threats detected by signature-based threat analysis may be similar to, identical with, or different from threated detected by heuristic-based threat analysis.

For some embodiments, the heuristic-based threat analysis may be replaced by, or augmented with, a non-heuristic threat analysis process that analyzes the threat analysis log data to detect threats in computer data.

The threat analysis system 108 may be configured to trigger one or more actions based on the results of the signature-based threat analysis or the heuristic-based threat analysis. As described herein, the actions triggered by the threat analysis system 108 can address one or more threats detected by the signature-based threat analysis or the heuristic-based threat analysis. The action may be one that configures or reconfigures the threat analysis system 108, or that configures or reconfigures a system or device external to the threat analysis system 108. Examples of triggered action include, without limitation, dropping a network packet in the network traffic that contains some or all of a detect threat, routing the network packet to a filter for deeper packet inspection, tagging the network packet with a meta risk indicator or a meta risk score, rerouting the network packet to its network destination, or rerouting the network packet to a sandbox for quarantine (e.g., honeypot). An action may involve configuring a network device, such as a router, switch, or network traffic aggregation system, and the like, to address a detected threat or protect against future threats. With respect to the example environment 100, the threat analysis system 108 may respond to a threat detected in the network traffic by configuring or reconfiguring the edge network device 106 (e.g., edge router) or a network device coupled on the internal network 110. For some embodiments, the threat analysis system 108 may trigger an action based on network security issue detected by a SIEM. By triggering one or more actions, the threat analysis system 108 can tune the edge network device 106, the internal network 110, or related components to counter a threat.

In some embodiments, the threat analysis system 108 sends a notification to one or more individuals upon detection of one or more threats, upon detection of particular threats, or upon detection of particular types of threats. Depending on the embodiment, the notification may be an electronic message, such as an e-mail, text message, or other open/proprietary machine readable formats, transmitted by the threat analysis system 108, or by way of an action system, such as a SIEM. Where no threats are detected by either the signature-based threat analysis or the heuristic-based threat analysis, the threat analysis system 108 may allow the network traffic to pass through threat analysis system 108 without intervention.

Figure 2:
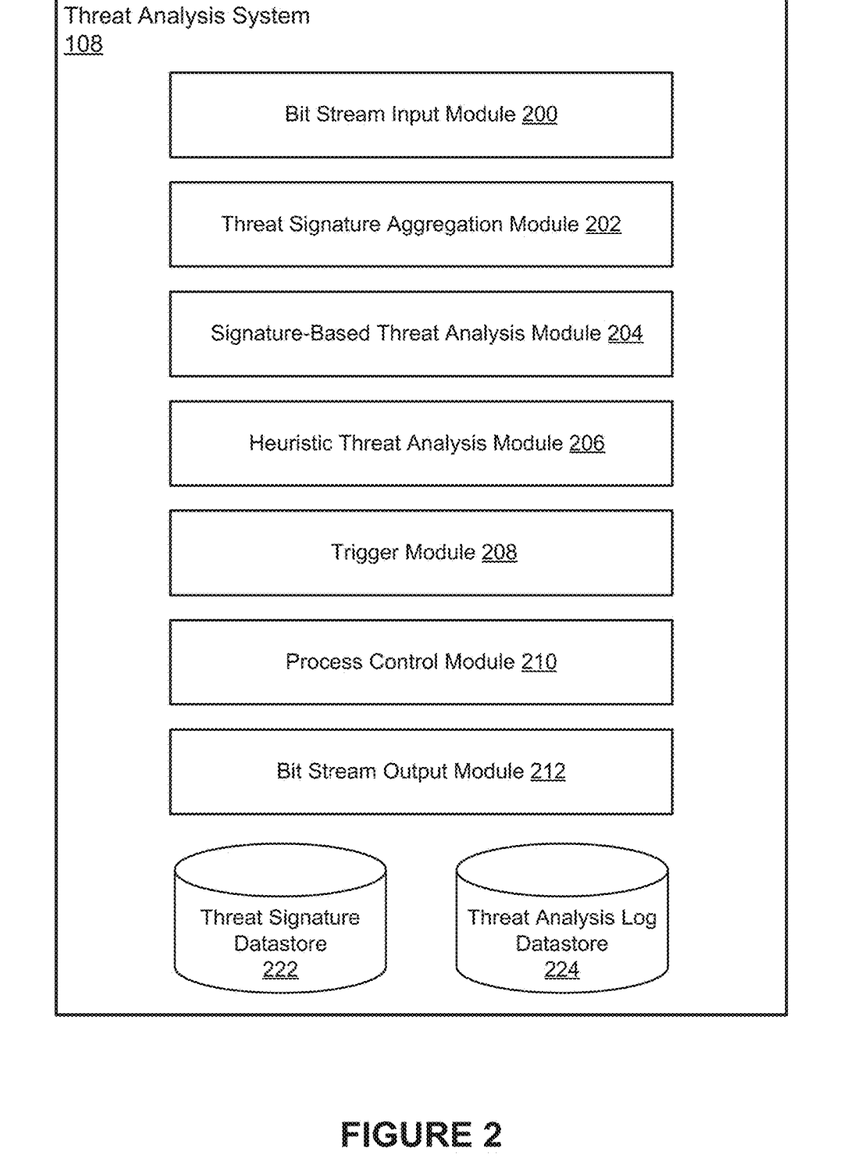
FIG. 2 illustrates an example threat analysis system, according to an embodiment of the present disclosure.

FIG. 2 illustrates the threat analysis system 108, according to an embodiment of the present disclosure. As shown, the threat analysis system 108 may comprise a bit stream input module 200, a threat signature aggregation module 202, a signature-based threat analysis module 204, a heuristic threat analysis module 206, a trigger module 208, a process control module 210, a bit stream output module 212, a threat signature datastore 222, and a threat analysis log datastore 224. In accordance with some embodiments, the threat analysis system 108 may be configured to perform various aggregation, analysis, identification, logging, triggering, and process control operations described herein.

The bit stream input module 200 may be configured to receive network data being communicated from a network source to a network destination through the threat analysis system 108. The threat signature aggregation module 202 may be configured to aggregate threat signatures from two or more of the threat signature sources, and may be further configured to store the aggregated threat signature locally on the threat signature datastore 222. The signature-based threat analysis module 204 may be configured to perform a signature-based threat analysis of the network traffic using the threat signatures aggregated by the threat signature aggregation module 202 from two or more of the threat signatures sources. The heuristic threat analysis module 206 may be configured to perform heuristic-based threat analysis of the network traffic by analyzing the threat analysis log data generated during the signature-based threat analysis performed by the signature-based threat analysis module 204, or generated during threat analysis performed by another (e.g., third-party) threat analysis systems (e.g., such as one provided by McAfee®). The trigger module 208 may be configured to trigger one or more actions based on the results of the signature-based threat analysis or the heuristic-based threat analysis.

The process control module 210 may be configured to control the bit stream vector processing of network data as the signature-based threat analysis is performed on the network data by the signature-based threat analysis module 204. The process control module 210 may be also configured to control the bit stream vector processing of network data as the heuristic-based threat analysis is performed on the network data by the heuristic threat analysis module 206. The process control module 210 may be further configured to control the bit stream vector processing of network data as trigger actions are performed with respect to the network data by the trigger module 208. The bit stream output module 212 may be configured to permit the network data to pass through the threat analysis system 108, undeterred, when no threats are detected by either the signature-based threat analysis or the heuristic-based threat analysis.

The threat signature datastore 222 may be configured to implement or facilitate data storage with respect to various components of the threat analysis system 108, including storage of threat signature aggregated from two or more threat signature sources. Depending on the embodiment, the threat signature datastore 222 may be implemented by a database or the like.

The threat analysis log datastore 224 may be configured to implement or facilitate data storage with respect to various components of the threat analysis system 108, including storage of threat analysis log data generated during threat analysis performed by the signature-based threat analysis module 204 or the heuristic threat analysis module 206. For some embodiments, the threat analysis log datastore 224 may also include threat analysis log data generated by third-party threat analysis systems or devices, which may be external to the threat analysis system 108. Depending on the embodiment, the threat analysis log datastore 224 may be implemented by a database or the like.

Figure 3:
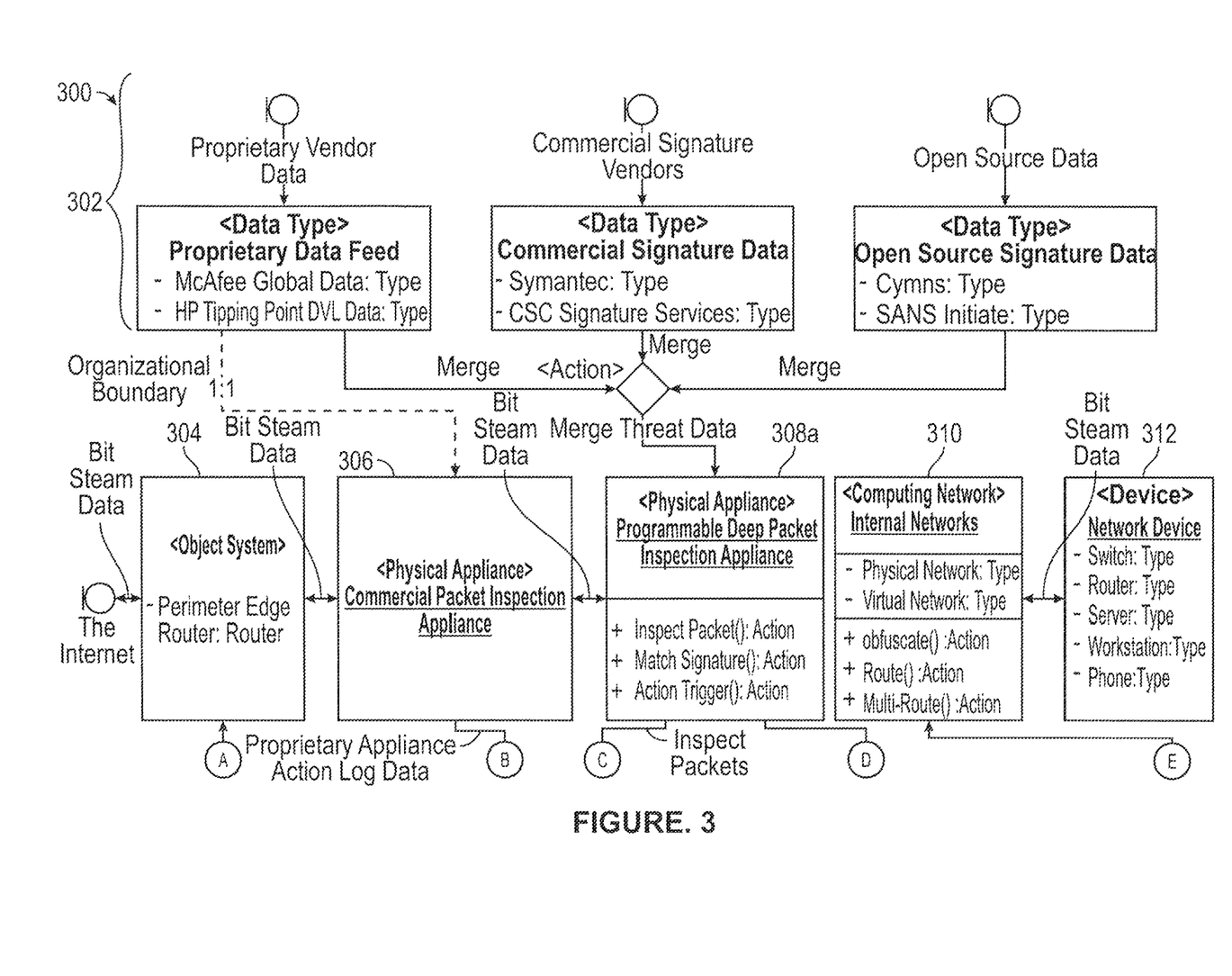
FIG. 3 illustrates an example threat analysis system in an example environment, according to an embodiment of the present disclosure.

FIG. 3 illustrates an example threat analysis system 308b in an example environment 300, according to an embodiment of the present disclosure. As shown, the example environment 300 includes a plurality of threat signature sources 302, a perimeter edge router 304, a commercial packet inspection appliance 306, a programmable deep packet inspection appliance 308a including the example threat analysis system 308b, an internal network 310, a network device 312, a traffic aggregation system 314, and an action system 332. As also shown, the threat analysis system 308b may include a packet inspection system 316, a signature matching system 318, an analytics system 320, and a trigger system 322.

In some embodiments, the perimeter edge router 304 receives bit stream data from a public network, such as the Internet, the perimeter edge router 304 routes the received bit stream data to the commercial packet inspection appliance 306, and the commercial packet inspection appliance 306 routes the bit stream data to the programmable deep packet inspection appliance 308a. The threat analysis system 308b, included by and implemented on the programmable deep packet inspection appliance 308a, may use the packet inspection system 316 to analyze (e.g., inspect) one or more packets included in the bit stream data.

The packet inspection system 316 may analyze the one or more packets for threats based on threat signatures aggregated by the programmable deep packet inspection appliance 308a. For some embodiments, the programmable deep packet inspection appliance 308a aggregates the threat signatures from two or more of the threat signature sources 302, merges the aggregated threat signatures into merged threat data, and then provides the merged threat data to the signature matching system 318. The packet inspection system 316 may utilize the signature matching system 318 to facilitate matching data in a packet of the bit stream data with threat signatures contained in the merged threat data.

The packet inspection system 316 may also analyze the one or more packets for threats based on threat analysis log data provided by the commercial packet inspection appliance 306. In this way, the packet inspection system 316 can analyze the one or more packets based on proprietary threat signatures that are otherwise not available for direct aggregation (e.g., threat signatures produced for exclusive use by certain commercial packet inspection appliances). Depending on the embodiment, the packet inspection system 316 may be implemented using an open source software application for packet inspection. The packet inspection system 316 may be implemented using one or more conventional programmable appliances, including but not limited to Bivio 7000® or 8000i® platform by Bivio Networks®.

Where the packet inspection system 316 does not detect a match between data in a packet of the bit stream data and at least one of the threat signatures in the merged threat data, the threat analysis system 308b may send the packet to its destination at step 324 and the log event process can log the no-signature-match result using a log event process 326. Where the packet inspection system 316 detects a match between data in a packet of the bit stream data and at least one of the threat signatures in the merged threat data, a log event process 326 can log the signature match result. Subsequently, the log event process 326 can provide the log data to the action system 332, such as a SIEM, which may analyze the log data and take action accordingly. For example, after analyzing the log data, the action system 332 may notify a security operations officer, or automatically notify another system using machine readable electronic formats, that the log data indicates the detection of a threat in the bit stream data. In another instance, after analyzing the log data, the action system 332 may detect a security issue that may have not been detected by the packet inspection system 316 and in response the action system 332 may cause a trigger action process 330 to trigger an action.

During an interpolation process 328, the analytics system 320 may use a heuristic analytics engine, or a comparative analytics engine, to analyze the log data produced by the log event process 326 to detect threats in the bit stream data. The analytics system 320 may further determine correlations based on the log data analyzed and learn correlation behavior over time. During the trigger action process, the trigger system 322 can trigger an action to address (e.g., protect against) a threat detected by the packet inspection system 316 or the analytics system 320. The particular action triggered by the trigger system 322 may be determined based on the results of the signature-based threat analysis performed by the packet inspection system 316 or the results of the heuristic-based threat analysis performed by the analytics system 320.

Additionally, depending on the results of the signature-based threat analysis performed by the packet inspection system 316 or the results of the heuristic-based threat analysis performed by the analytics system 320, the action may be triggered with respect to the internal network 310 or the traffic aggregation system 314. The internal network 310 may be used by one or more network devices 312 (e.g., switch, router, server, client device) to communicate with the public network (e.g., the Internet). The internal network 310 may comprise a physical network or a virtual network (e.g., SDN), and the trigger may reconfigure components of the physical or the virtual network included in the internal network 310, such as physical or virtual routers. The traffic aggregation system 314 may control the configuration of the perimeter edge router 304, which controls egress and ingress of bit stream data through the perimeter of an internal network.

Figure 4:
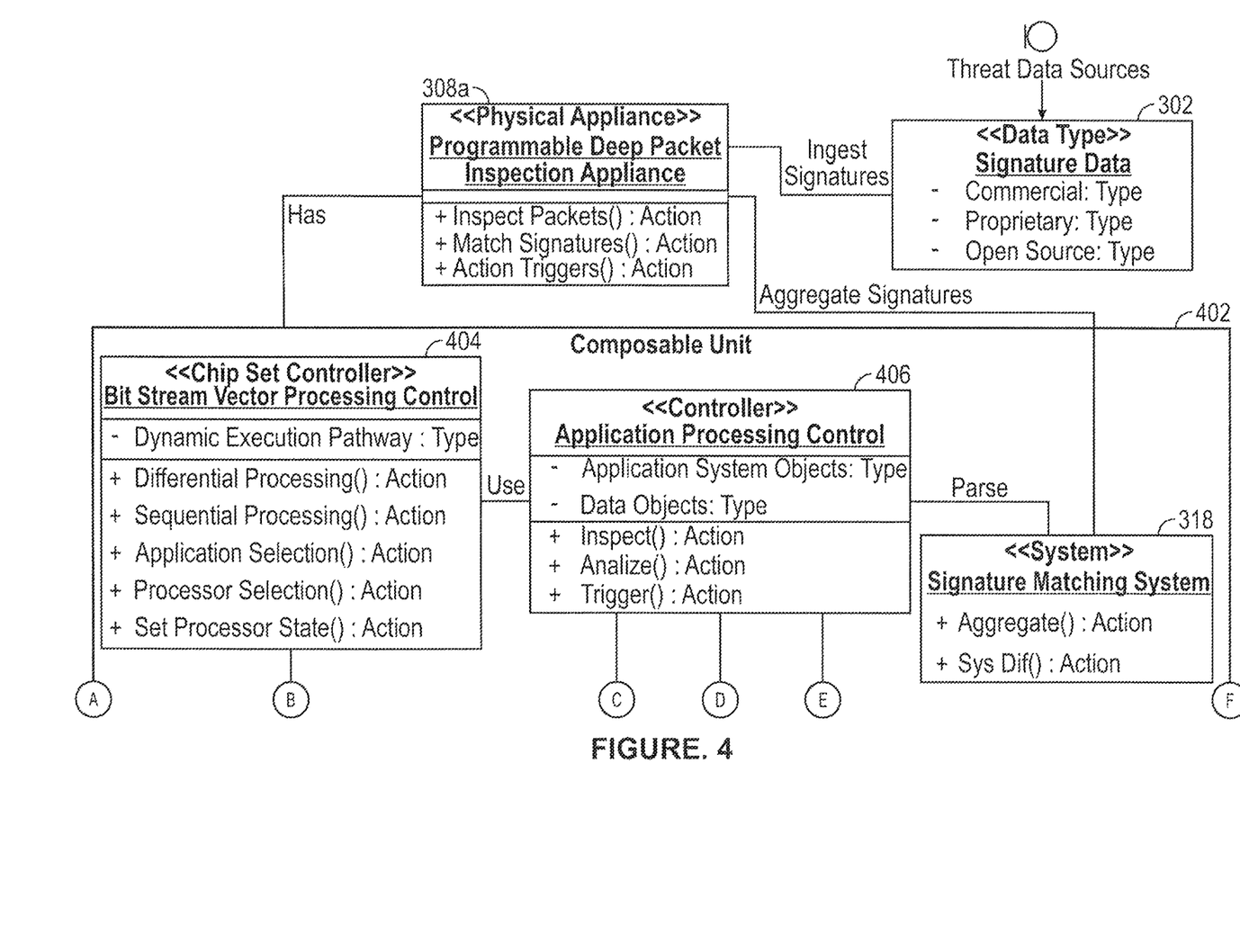
FIG. 4 illustrates an example threat analysis system in an example environment, according to an embodiment of the present disclosure.

FIG. 4 illustrates an example threat analysis system 402 in an example environment 400, according to an embodiment of the present disclosure. As shown, the example environment 400 includes the plurality of threat signature sources 302, the programmable deep packet inspection appliance 308a including the example threat analysis system 402, and the action system 332. As also shown, the threat analysis system 402 may include a bit stream vector processing control 404, an application processing control 406, the signature matching system 318, one or more processors 408, the packet inspection system 316, the analytics system 320, the trigger system 322.

In some embodiments, one or more processors in the set of processors 408 processes (e.g., analyze) bit stream data in accordance with the components of the threat analysis system 402. Additionally, the one or more of the processors 408 may process the bit stream data using bit stream vector processing. For some embodiments, the bit stream vector processing control 404 provides dynamic execution pathway control of one or more of the processors 408 as those processors operate on bit stream data using bit stream vector processing. For example, the bit stream vector processing control 404 may permit the threat analysis system 402 to perform signature-based analysis on bit stream data using sequential or differential bit stream vector processing on one or more of the processors 408.

Additionally, the bit stream vector processing control 404, in combination with the application processing control 406, may permit the threat analysis system 402 to dedicate a specific subset of the processors 408 for bit stream vector processing of certain bit stream data, or dedicate a specific subset of the processors 408 for performing particular processes of the threat analysis system 402. For instance, through the bit stream vector processing control 404, the threat analysis system 402 can dedicate a first subset of the processors 408 for performing signature-based threat analysis of bit stream data, and dedicate a second subset of the processors 408 for performing heuristic-based threat analysis of bit stream data. The level of processing control provided by the bit stream vector processing control 404 can ensure that programmable deep packet inspection appliance 308a, and the threat analysis system 402 in particular, can analyze bit stream data at or near wire speed.

Figure 5:
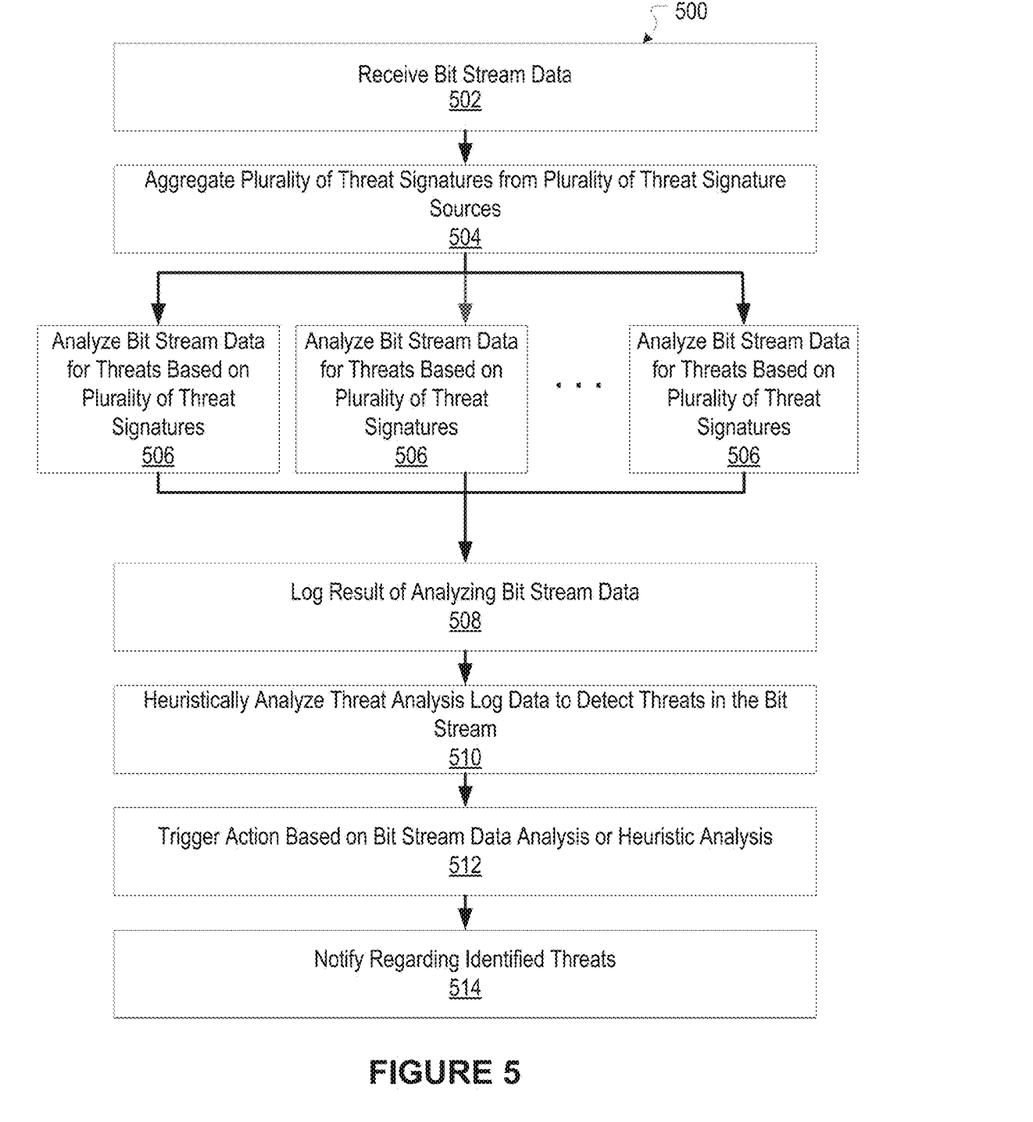
FIG. 5 illustrates an example process for analyzing threats, according to an embodiment of the present disclosure.

FIG. 5 illustrates an example process 500 for analyzing threats, according to an embodiment of the present disclosure. In some embodiments, the threat analysis process 500 may be performed in whole or in part by the threat analysis system 108 described herein. For some embodiments, the process for analyzing data flows may perform more or less operations than what is illustrated in FIG. 5, and may perform the operations illustrated in FIG. 5 in an order different than the order shown.

Figure 6:
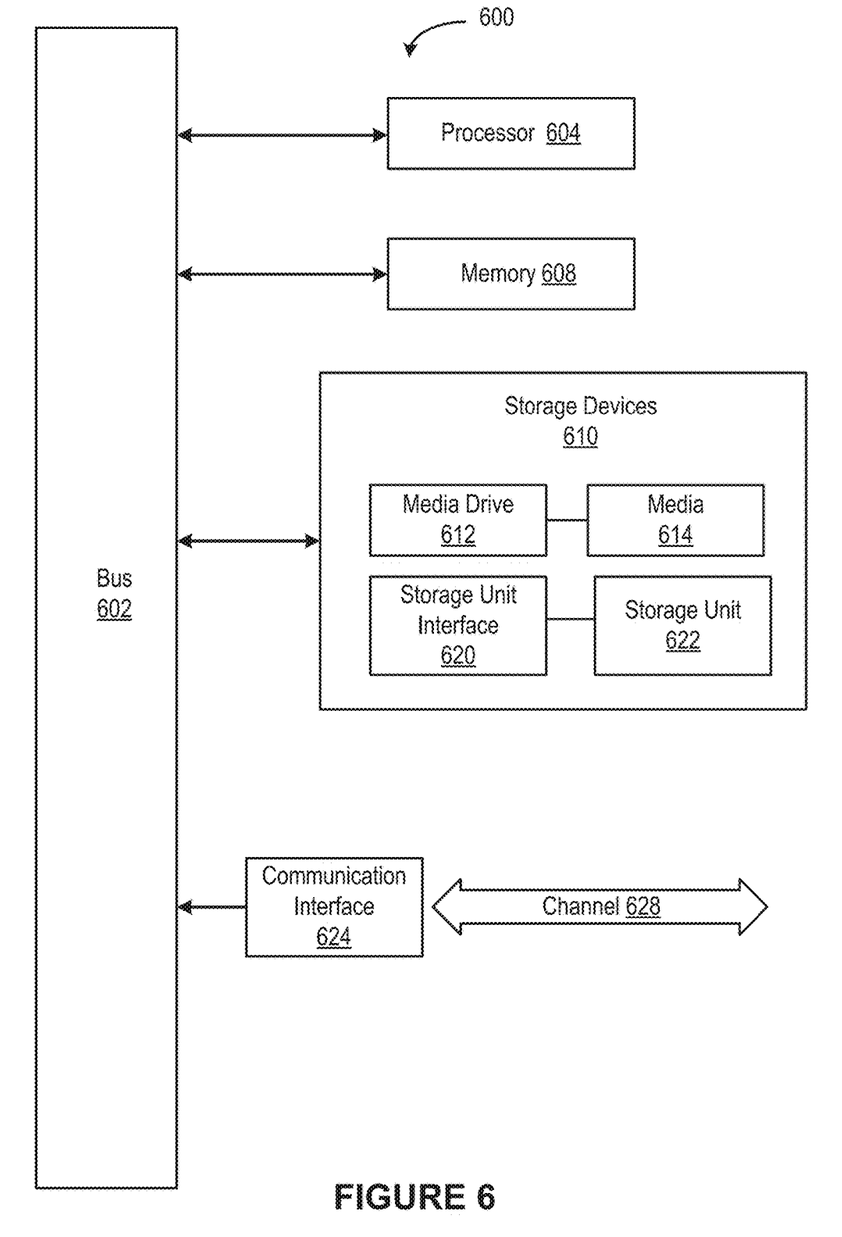
FIG. 6 illustrates an example of a computer system that can be utilized in various scenarios, according to an embodiment of the present disclosure.

At block 502, bit stream data is received. Depending on the embodiment, the bit stream data may be received from a network device, or some other source of bit stream data. The bit stream data may be received by a threat analysis system described herein, such as the threat analysis system 108. The bit stream data may comprise one or more data segments (e.g., network frames or network packets), which may be transmitted from a data source (e.g., source network device) and addressed to a data sink (e.g., destination network device). At block 504, a plurality of threat signatures from a plurality of threat signature sources is aggregated. At block(s) 506, the bit stream data received at block 502 is analyzed for threats based on the plurality of threat signatures aggregated at block 504, and optionally in parallel across differential algorithm sets. At block 508, a result of analyzing the bit stream data, at block 506, is logged as threat analysis log data. At block 510, the threat analysis log data is heuristically analyzed for threats in the bit stream data. At block 512, an action is triggered based on analysis of the bit stream data at block 506, or based on heuristic analysis of the threat analysis log data at block 510. At block 514, a user is notified regarding one or more threats identified by analysis of the bit stream data at block 506, or identified by heuristic analysis of the threat analysis log data at block 510.

Where components or modules of the invention are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example—computing module 600. After reading this description, it will become apparent to a person skilled in the relevant art how to implement the invention using other computing modules or architectures.

Referring now to FIG. 6, computing module 600 may represent, for example, computing or processing capabilities found within desktop, laptop and notebook computers; hand-held computing devices (PDA's, smart phones, cell phones, palmtops, tablets, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

In some embodiments, some or all the elements of FIG. 6 may be emulated via "virtualization software," such as VMWare®, and others. Accordingly, various embodiments may utilize virtualization software that provides an execution environment using emulated hardware, such as a "virtual machine". The virtualized software may be implemented, and provided, as cloud-based services, such as Amazon Web Services Elastic Compute Cloud.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port, Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the disclosed invention as discussed herein.

While various embodiments of the disclosed invention have been described above, it should be understood that they have been presented by way of example only, and not of limitation. Likewise, the various diagrams may depict an example architectural or other configuration for the disclosed invention, which is done to aid in understanding the features and functionality that can be included in the disclosed invention. The disclosed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed invention, whether or not such embodiments are described and whether or not such features are presented as being a part of a described embodiment. Thus, the breadth and scope of the invention disclosed herein should not be limited by any of the above-described exemplary embodiments.

Reference in this specification to "one embodiment", "an embodiment", "other embodiments", "one series of embodiments", "some embodiments", "various embodiments", "instance", "instances", "for example", "examples", or the like means that a particular feature, design, structure, or characteristic described in connection with the embodiment, instance, or example is included in at least one embodiment, instance, or example of the disclosure. The appearances of these terms in various places in the specification are not necessarily all referring to the same embodiment, instance, or example, nor are separate or alternative embodiments, instances, or examples mutually exclusive of other embodiments, instances, or examples. Moreover, whether or not there is express reference to an "embodiment" or the like, various features are described, which may be variously combined and included in some embodiments, instances, or examples, but also variously omitted in other embodiments, instances, or examples. Similarly, various features are described that may be preferences or requirements for some embodiments, instances, or embodiments, but not other embodiments, instances, or examples.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A computer implemented method comprising:
   aggregating, by a computer system, a plurality of threat signatures from a plurality of threat signature data sources;
   analyzing, by the computer system, bit stream data based on the plurality of threat signatures to detect a first threat in the bit stream data, wherein a second threat is not detected in the bit stream data, the bit stream data being analyzed using a signature-based threat analysis;
   logging, by the computer system, a result of analyzing the bit stream data as threat analysis log data;
   analyzing, by the computer system, the threat analysis log data to detect the second threat in the bit stream data, the threat analysis log data being analyzed using a heuristic-based threat analysis;
   triggering, by the computer system, an action based on the analyzing the bit stream data and based on the analyzing the threat analysis log data, wherein the action includes configuring a network device to address the first threat in response to the first threat being detected in the bit stream data and configuring the network device to address the second threat in response to the second threat being detected in the bit stream data.

2. The computer implemented method of claim 1, further comprising receiving the bit stream data over a network connection from a network device.

3. The computer implemented method of claim 1, wherein the analyzing bit stream data and the analyzing the threat analysis log data are performed in parallel or in sequence and are included in a chain of independent or cooperative analyses associated with security.

4. The computer implemented method of claim 1, wherein the analyzing the threat analysis log data is based on at least one heuristic.

5. The computer implemented method of claim 1, wherein the first threat and the second threat are similar.

6. The computer implemented method of claim 1, further comprising outputting the bit stream data in response to the first threat and the second threat not being detected in the bit stream data.

7. The computer implemented method of claim 6, wherein the network device is configured by configuring a network traffic aggregation system, the network traffic aggregation system configuring the network device.

8. The computer implemented method of claim 6, wherein the network device is an edge network device.

9. The computer implemented method of claim 6, wherein the network device is an internal network device.

10. The computer implemented method of claim 1, wherein the analyzing the bit stream data based on the plurality of threat signatures comprises performing deep packet inspection based on the plurality of threat signatures.

11. The computer implemented method of claim 1, wherein the analyzing the bit stream data is performed by bit stream vector processing, or the analyzing the threat analysis log data is performed by bit stream vector processing.

12. The computer implemented method of claim 1, wherein the action comprises at least one of dropping a packet in the bit stream data, routing the packet to a filter for deeper packet inspection, tagging the packet with a meta risk indicator or a meta risk score, rerouting the packet to its destination, or rerouting the packet to a sandbox for quarantine.

13. The computer implemented method of claim 1, wherein the triggering the action is performed by bit stream vector processing by a combination of parallel and sequential set of workers that are dynamically assigned.

14. The computer implemented method of claim 1, wherein at least one threat signature data source in the plurality of threat signature data sources is commercial, proprietary, or open source.

15. The computer implemented method of claim 1, wherein the plurality of threat signature data sources includes independent organizations.

16. The computer implemented method of claim 1, wherein the threat analysis log data includes log data produced by an external deep packet inspection system.

17. The computer implemented method of claim 16, wherein the external deep packet inspection system performs deep packet inspection on the bit stream data before the analyzing the bit stream data based on the plurality of threat signatures, or before the analyzing the threat analysis log data.

18. A system comprising:
   at least one processor; and
   a memory storing instructions configured to instruct the at least one processor to perform:
      aggregating a plurality of threat signatures from a plurality of threat signature data sources;
      analyzing bit stream data, based on the plurality of threat signatures, to detect a first threat in the bit stream data, wherein a second threat is not detected in the bit stream data, the bit stream data being analyzed using a signature-based threat analysis;
      logging a result of analyzing the bit stream data as threat analysis log data;
      analyzing the threat analysis log data to detect the second threat in the bit stream data, the threat analysis log data being analyzed using a heuristic-based threat analysis;
      triggering an action based on the analyzing the bit stream data and based on the analyzing the threat the analysis log data, wherein the action includes configuring a network device to address the first threat in response to the first threat being detected in the bit stream data and configuring the network device to address the second threat in response to the second threat being detected in the bit stream data.

19. A non-transitory computer storage medium storing computer-executable instructions that, when executed, cause a computer system to perform a computer-implemented method comprising:
- aggregating a plurality of threat signatures from a plurality of threat signature data sources;
- analyzing bit stream data, based on the plurality of threat signatures, to detect a first threat in the bit stream data, wherein a second threat is not detected in the bit stream data, the bit stream data being analyzed using a signature-based threat analysis;
- logging a result of analyzing the bit stream data as threat analysis log data;
- analyzing the threat analysis log data to detect the second threat in the bit stream data, the threat analysis log data being analyzed using a heuristic-based threat analysis;
- triggering an action based on the analyzing the bit stream data and based on the analyzing the threat the analysis log data, wherein the action includes configuring a network device to address the first threat in response to the first threat being detected in the bit stream data and configuring the network device to address the second threat in response to the second threat being detected in the bit stream data.

* * * * *